US008965752B2

(12) United States Patent
Chalmers et al.

(10) Patent No.: US 8,965,752 B2
(45) Date of Patent: Feb. 24, 2015

(54) FILTERING PROHIBITED LANGUAGE FORMED INADVERTENTLY VIA A USER-INTERFACE

(75) Inventors: Diane C. Chalmers, Rochester, MN (US); Nixon Cheaz, Cary, NC (US); Andrew J. Ivory, Wake Forest, NC (US); David M. Stecher, Durham, NC (US)

(73) Assignee: International Business Machines Corporation, Armonk, NY (US)

( * ) Notice: Subject to any disclaimer, the term of this patent is extended or adjusted under 35 U.S.C. 154(b) by 780 days.

(21) Appl. No.: 13/267,570

(22) Filed: Oct. 6, 2011

(65) Prior Publication Data

US 2013/0090917 A1 Apr. 11, 2013

(51) Int. Cl.
*G06F 17/27* (2006.01)
*G06F 17/21* (2006.01)

(52) U.S. Cl.
CPC .......... *G06F 17/212* (2013.01); *G06F 17/2735* (2013.01); *G06F 17/277* (2013.01)
USPC .......................................................... 704/9

(58) Field of Classification Search
USPC ............................................................ 704/9
See application file for complete search history.

(56) References Cited

U.S. PATENT DOCUMENTS

| | | | |
|---|---|---|---|
| 5,796,948 A * | 8/1998 | Cohen ........................... | 709/206 |
| 7,398,203 B2 | 7/2008 | Corston-Oliver et al. | |
| 7,752,274 B2 * | 7/2010 | Pagan ........................... | 709/206 |
| 8,380,725 B2 * | 2/2013 | Borst et al. ..................... | 707/754 |
| 2003/0192044 A1 * | 10/2003 | Huntsman ........................ | 725/25 |
| 2008/0134282 A1 * | 6/2008 | Fridman et al. .................. | 726/1 |
| 2009/0228557 A1 * | 9/2009 | Ganz et al. ..................... | 709/206 |
| 2010/0099444 A1 * | 4/2010 | Coulter et al. ................ | 455/466 |
| 2011/0191105 A1 * | 8/2011 | Spears .......................... | 704/251 |
| 2012/0331517 A1 * | 12/2012 | Wilcox ............................ | 726/1 |

OTHER PUBLICATIONS

"How do you implement a good profanity filter?", StackOverFlow, Obtained from internet: http://stackoverflow.com/questions/273516/how-do-you-implement-a-good-profanity-filter 2009 , 7 pages.

(Continued)

*Primary Examiner* — Jialong He
(74) *Attorney, Agent, or Firm* — DeLizio Gilliam, PLLC

(57) ABSTRACT

Some embodiments of the inventive subject matter are directed to detecting that a text string is subject to an algorithmic function that would modify one of more parts of the text string to be at least one proposed text substring for presentation via a user interface, wherein the at least one proposed text substring is a portion of the text string. Some embodiments are further directed to evaluating the at least one proposed text substring against one or more prohibited text strings prohibited for presentation via the user interface and detecting, in response to the evaluating of the at least one proposed text substring against the one or more prohibited text strings, that the at least one proposed text substring is one of the one or more prohibited text strings. Some embodiments are further directed to modifying the at least one proposed text substring, in response to detecting that the at least one proposed text substring is one of the one or more prohibited text strings.

19 Claims, 5 Drawing Sheets

(56) References Cited

OTHER PUBLICATIONS

"Profanity Filter for Content?", Telerik, Obtained from internet: http://www.sitefinity.com/devnet/forums/sitefinity-3-x/developing-with-sitefinity/profanity-filter-for-content.aspx 2011, 2 pages.

"WebPurify Profanity Filter", WebFurther, LLC., Obtained from internet: http://www.webpurify.com/ 2011, 2 pages.

* cited by examiner

FILTERING PROHIBITED LANGUAGE FORMED INADVERTENTLY VIA A USER-INTERFACE

BACKGROUND

Embodiments of the inventive subject matter generally relate to the field of filtering, and, more particularly, to filtering of offensive or profane language.

A user interface on a computer display often encounters one or more scenarios where text on the user interface is modified, or appears to be modified, in ways that were not intended. Such unintended modifications to appearance of text can sometimes result in text that appears to be offensive or profane. For example, sometimes a user interface performs an action that automatically abbreviates or hyphenates text, which unintentionally results in text that appears to be profanity, or some other type of inappropriate or prohibited language. Further, sometimes a user, or program, moves or resizes a first window, on a computer display, which partially obscures text on a second window, or other background object, behind the first window. The text that is partially obscured can appear to be offensive, profane, or otherwise inappropriate when it is partially obscured.

SUMMARY

Some embodiments of the inventive subject matter are directed to detecting that a text string is subject to an algorithmic function that would modify one of more parts of the text string to be at least one proposed text substring for presentation via a user interface, wherein the at least one proposed text substring is a portion of the text string. Some embodiments are further directed to evaluating the at least one proposed text substring against one or more prohibited text strings prohibited for presentation via the user interface and detecting, in response to the evaluating of the at least one proposed text substring against the one or more prohibited text strings, that the at least one proposed text substring is one of the one or more prohibited text strings. Some embodiments are further directed to modifying the at least one proposed text substring, in response to detecting that the at least one proposed text substring is one of the one or more prohibited text strings. Some other embodiments of the inventive subject matter are directed to detecting that an object in a graphical user interface obscures presentation of a first portion of a word below the object in a layering order of the graphical user interface, wherein a second portion of the word is displayed. Some embodiments are further directed to evaluating the second portion of the word against a plurality of words prohibited for presentation via the graphical user interface and detecting, in response to evaluation of the second portion of the word against the plurality of words prohibited for presentation via the graphical user interface, that the second portion of the word is one of the plurality of words prohibited for presentation via the graphical user interface. Some embodiments are further directed to modifying presentation of the word in response to detection that the second portion of the word is one of the plurality of words prohibited for presentation via the graphical user interface.

BRIEF DESCRIPTION OF THE DRAWINGS

The present embodiments may be better understood, and numerous objects, features, and advantages made apparent to those skilled in the art by referencing the accompanying drawings.

DESCRIPTION OF EMBODIMENT(S)

The description that follows includes example systems, methods, techniques, instruction sequences, and computer program products that embody techniques of the present inventive subject matter. However, it is understood that the described embodiments may be practiced without these specific details. For instance, although some examples refer to filtering written profanity, other instances may include filtering other types of content that are not written or textually based, such as graphics, images, expressions, sounds, some combinations therefore, etc. Further, other embodiments may filter any type or language specified in a collection, or library, of prohibited words, phrases, strings, symbol groupings, number groupings, etc. For example, some embodiments may utilize a customizable electronic dictionary, or repository, of words or phrases that a user specifically indicates as being profane, offensive, or otherwise prohibited from presentation via a user interface, whether or not those words or phrases are considered to be offensive or profane to the general public. In other instances, well-known instruction instances, protocols, structures, and techniques have not been shown in detail in order not to obfuscate the description.

In some embodiments, prohibited language, such as profanity, can occur inadvertently, because of computer processes that abbreviate text, movement of user interfaces that cover portions of text, etc. Embodiments of the inventive subject matter detect, prevent, and/or correct prohibited language that was formed inadvertently. For example, a language filter that implements the inventive subject matter can detect when situations occur, via a user interface, which automatically abbreviates text, covers text, or interferes with a normal presentation of a word or expression. The language filter can monitor the state of computer programs, objects, etc, for the situations that could inadvertently cause the appearance of prohibited language and either prevent the prohibited language from occurring, or correct the prohibited language. Many examples and details wilt be described.

Figure 1A:
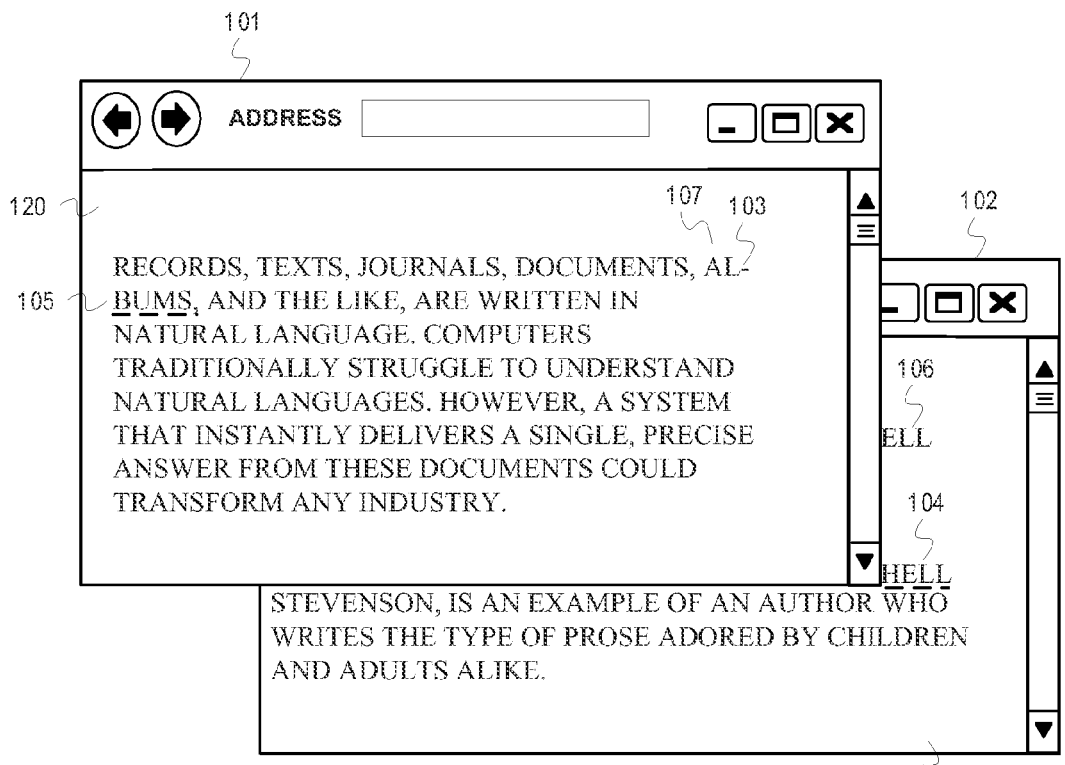
FIGS. 1A-1B are example conceptual diagrams of filtering prohibited language caused via object layering and algorithmic textual modification.
Figure 1B:
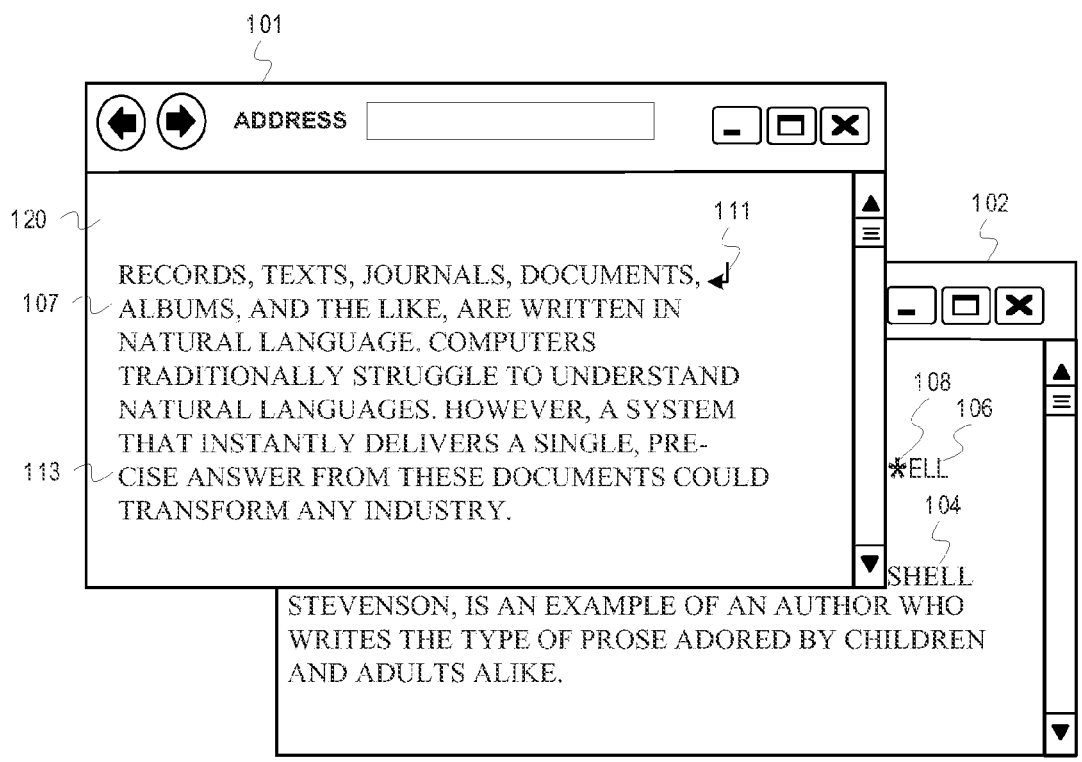

FIGS. 1A-1B are example conceptual diagrams of filtering prohibited language caused via object layering and algorithmic textual modification. In FIG. 1A, first window 101 presents first content 120 that includes text. A program associated with the first window 101 automatically modifies text within the first content 120 according to one or more algorithms, functions, subroutines, etc., such as a line wrap function that divides a word 107 (e.g., "albums") into a first part 103 and a second part 105. Further, the first window 101 is higher in object layering order than a second window 102. Thus, the first window 101 covers at least a portion of the second window 102. The first window 101 further obscures a portion of second content 121, such as the display of words 104 and 106 within the second window 102. Thus, because of textual-modification functions and/or the positioning of windows, there is a possibility that some display of words unintentionally present prohibited language.

FIG. 1B, a system, according to some embodiments, checks the first part 103 and the second part 105 of the word 107 displayed in the first window 101 and detects that the second part 105 of the word may be considered prohibited language. The system also checks the display of partially obscured words 104 and 106, and determines that the portion of the word 104 that is presented appears to be prohibited language. Prohibited language may include words with degrees of offensiveness, from obscene or vulgar language to irreverent or insensitive language. The system can refer to a dictionary of potentially profane terms. In some embodiments, a user can specify words that are offensive to the user and add to the dictionary of potentially profane terms.

Further, the system filters the apparent prohibited language. For example, the system causes the word 107 to not be divided, such as by inserting a carriage return 111 in the content 120 before the word 107. In another embodiment, the system could instead replace one or more of the characters in the second part 105 of the word with a non-sense replacement character, or grawlix, such as typographical symbols (e.g., "@", "#", "%", etc.), or other characters, numbers, etc. (e.g., replace the "u" with a "v" to read "bvms"). In some embodiments, the system can instead rearrange letters in the second part 105 of the word (e.g., "bmus") or take one or more of the leading characters from the second part 105 of the word 107 and add it to the first part 103 of the word 107, even if the division does not fall between syllables (e.g., "alb-ums").

In another example, the system causes the words 104 and 106 to be filtered by changing coordinates of the first window 101 and/or the second window 102 along a horizontal (e.g., "x") dimensional coordinates axis. For instance, in FIG. 1B, the system moves the second window 102 to the right by changing one or more "x" coordinates of the window, thus exposing more letters of the word 104. In other embodiments, the system can resize the first window 101 or the second window 102 (e.g., partially expand or collapse a right edge of the window at least in the "x" direction) instead of merely moving the window.

The system further rechecks for any prohibited language after making a modification. For example, in FIG. 1B, when the system adds the carriage return 111, the text within the first content 120 causes the word 113 to be divided, so the system checks the divided parts of the word 113 for prohibited language. Further, in FIG. 1 when the system moves the second window 102, more of the word 106 is exposed and, unintentionally appears to form prohibited language. Thus, the system, instead of moving the window 102 again, replaces or covers one of the characters of the word 106 with a symbol 108, or similar character, graphic, or other object. In some embodiments, the system could have instead moved the window 102 to the left to obscure more of the words 106 and 104 behind the first window 101.

In some embodiments, the words 104 and 106 may be appear to textual, but are not textual characters. For example, the words 104 and 106 may be graphical objects or portions of a document that is graphically presented (e.g., a portable document format, or PDF, a REG, etc.). In such embodiments, the system can perform a text recognition function to analyze the appearance of the graphically presented words to determine whether prohibited language is inadvertently displayed, or about to be displayed.

In other embodiments, the words 104 and 106 may be textual characters. Each of the textual characters can include a bit that indicates whether the character is displayed ("display bit"). The system can use the display bits to determine what portion of a word is displayed. For example, the system determines, in FIG. 1A, that the last four letters of the text string "Shell" for the word 104 are displayed in sequence (e.g., the "h," "e" and "l" characters have a display bit of "1," to represent that they are displayed, while the "S" character has a display bit of "0" to represent that it is obscured, or not displayed). Thus, by checking the display bits for the sequence of displayed characters from the portion of a word 104, the system determined that the displayed portion of the word 104 apparently displays prohibited language. The system can check for prohibited language for any word where at least one of the display bits indicates that a portion of the word is displayed and at least one of the display bits indicates that a portion of the word is simultaneously not displayed.

Figure 2:
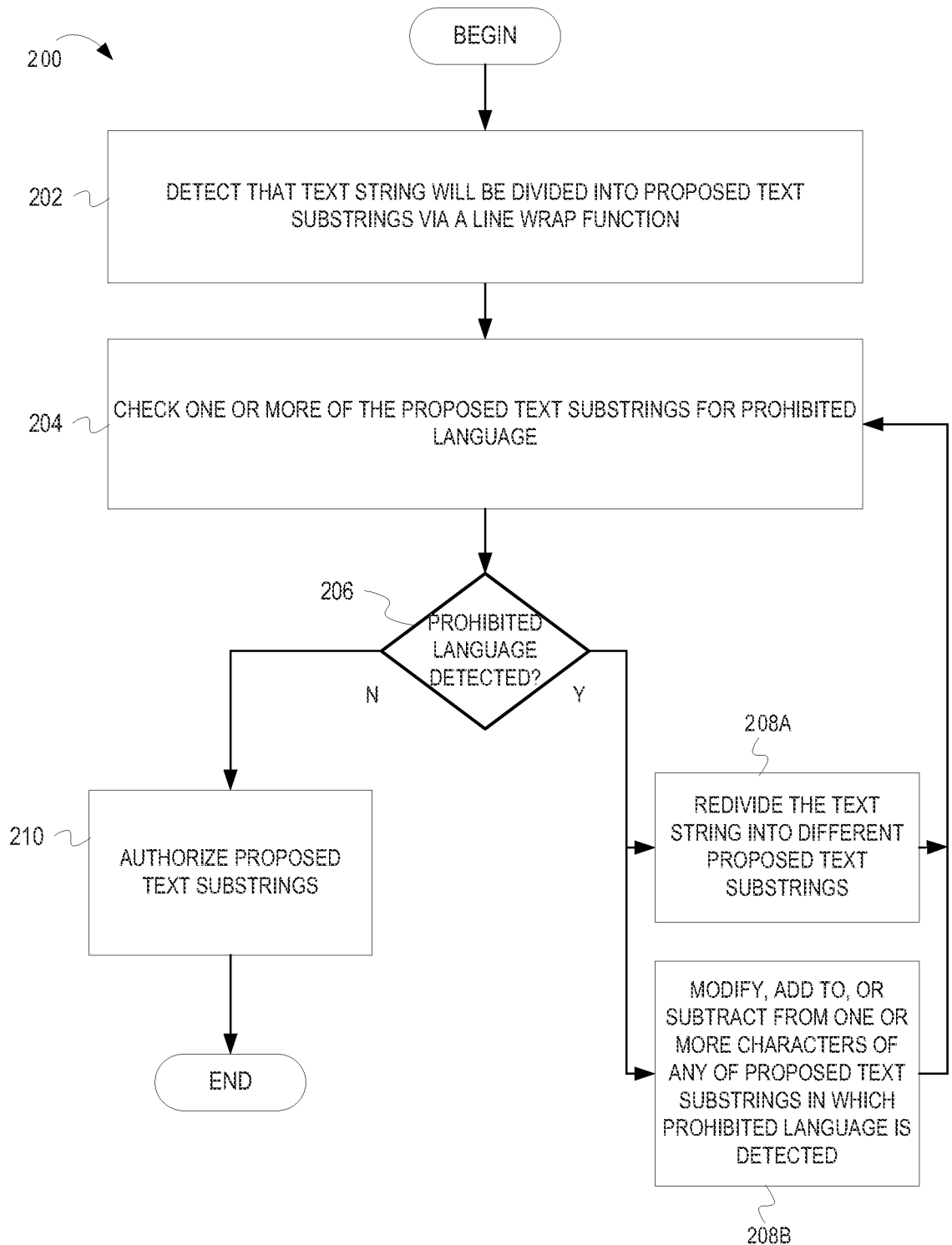
FIG. 2 is a flowchart depicting example operations for filtering prohibited language generated, or potentially generated, via a line-wrap function.

FIG. 2 is a flowchart depicting example operations for filtering prohibited language generated, or potentially generated, via a line-wrap function. For example purposes, operations associated with the blocks in FIG. 2 be described as being performed by a language filtering system ("system"). FIG. 2 illustrates a flow 200 that the system can perform.

Referring to FIG. 2, the system detects that a text string will be divided into proposed text strings via a line wrap function (202). For example, the system can determine, either prior to, concurrently, or after, a line wrap function occurs, whether the word will be, or has been, divided into proposed text strings. The proposed text strings are separate portions of the text string. FIG. 1A, for example, illustrated a word 107 that was divided into two parts. In some embodiments, the system determines what the potential portions of the divided text string will be prior to presenting the separate parts of the text string on a display. Thus, in some embodiments, the system detects prohibited language before it is displayed.

The system further checks one or more of the proposed text substrings for prohibited language (204). For example, the system can run each of the proposed text substrings through a language filter configured to detect and filter out prohibited language. In other words, the system can evaluate the proposed text substrings against a collection, or dictionary, of terms, words, text strings, etc. that are specified as being prohibited for presentation. The dictionary of terms can be stored in a file, database, or other data structure or memory store. In some embodiments, the location of the dictionary is on a memory associated with a local client. In other embodiments, the dictionary is on a memory associated with a server e.g., via an online service). In some instances, one of the text substrings may include a textual character at the end of the text substring, such as a dash, to emphasize that the text string has been divided at the end of a line and/or near a border of page, table, a column, or other such textual wrap barrier. The system can disregard, or remove, the textual character at the end of the text substring.

The system further determines whether prohibited language is detected (206) and, if so, the system can perform one or more different corrective processes. For example, the system can re-divide the text string into different proposed text strings (208A). In another example (i.e., instead of and/or concurrently with 208A) the system can modify, add to, or subtract from, one or more characters of any of the proposed text substrings in which prohibited language is detected. For instance, the system can modify characters in a text substring by swapping an order of characters in the text substring, replacing a character with a grawlix, obscuring characters with a graphic, etc. In some embodiments, the system may add an additional textual character, symbol, etc. (e.g., add a dash, a space, a period, a repeated consonant or vowel, etc.), to break up the appearance of prohibited language. In some embodiments, the system may remove a character remove a consonant or vowel from the text substring that causes the text substring to quality as prohibited language). The system can then recheck one or more of the proposed text substrings (204). For example, if the text string is re-divided (i.e., 208A), the system can check both of the different proposed text substrings again for prohibited language. If, however, only one of the text substrings was modified, added to, or subtracted from (i.e., 208B), then the system may only need to recheck one of the text substrings that was affected. If prohibited language is again detected (206), the system can repeat in a loop (e.g., 208A and/or 208B). If no prohibited language is detected (206), the system authorizes the proposed text substrings for the line wrap function. For instance, the system can return a result that indicates no prohibited language was detected and that indicates that the proposed text substrings can be presented via the line wrap function. In other examples, the system may check the text substrings immediately after the line-wrap function divides the text string and, if the system detects no prohibited language, then the system can do nothing and not interfere with the line-wrap function.

Figure 3:
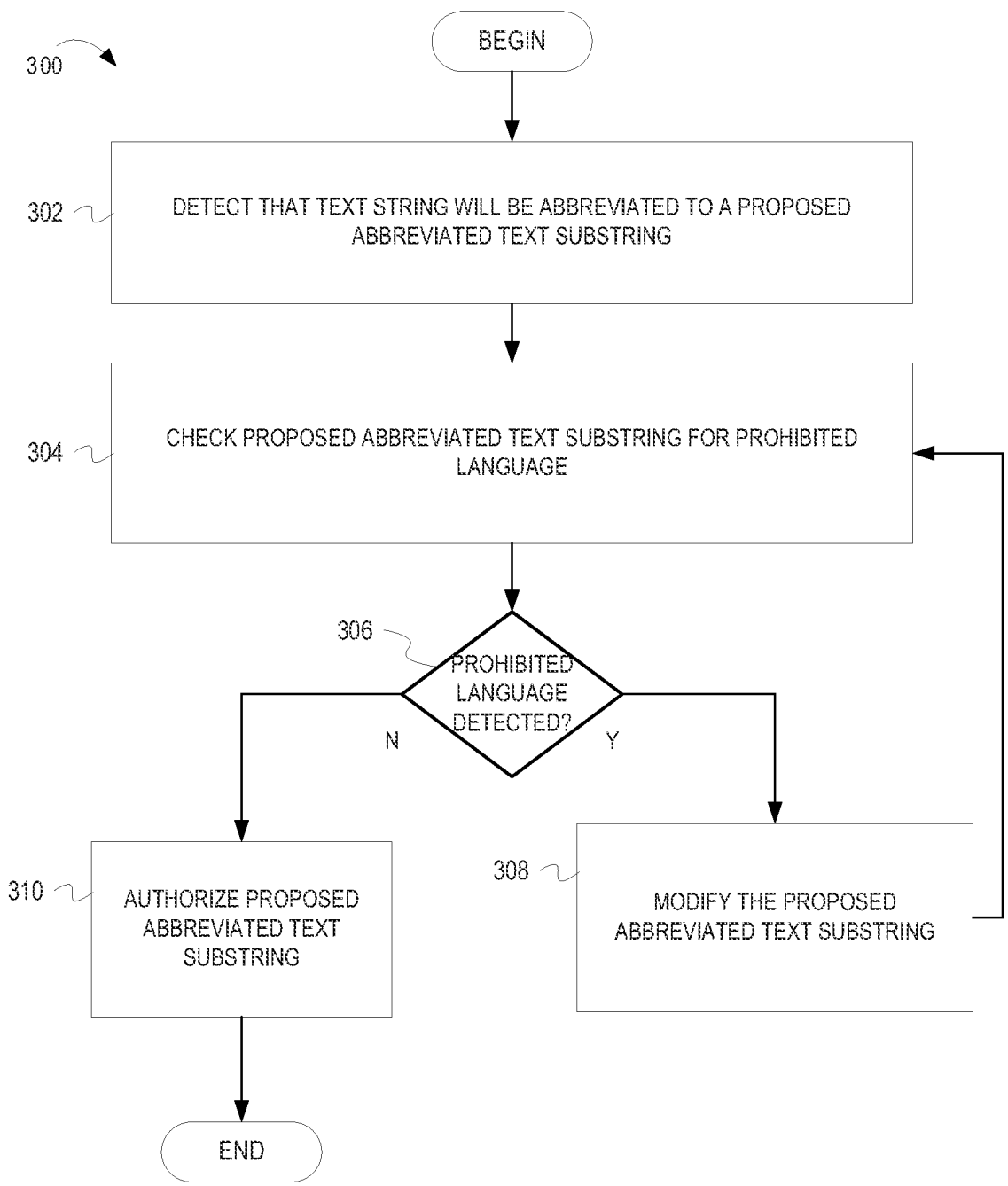
FIG. 3 is a flowchart depicting example operations for filtering prohibited language generated, or potentially generated, via a textual abbreviation function.

FIG. 3 is a flowchart depicting example operations for filtering prohibited language generated, or potentially generated, via a textual abbreviation function. For example purposes, operations associated with the blocks in FIG. 3 will be described as being performed by a language filtering system ("system"). FIG. 3 illustrates a flow 300 that the system can perform. In some embodiments, the flow can be performed in parallel with the flow of FIG. 2. In other embodiments, some or all of the flow of FIG. 3 may be performed separately and independently from the flow of FIG. 2.

Referring to FIG. 3, the system detects that a text string will be abbreviated to a proposed text substring (302). Algorithmic abbreviations can occur in various situations, such as abbreviations of text in tabs. As more tabs are opened in a user interface, the text on the previously opened tabs has less space in which to present text. An abbreviation function may inadvertently abbreviate text (e.g., the word "association") to a point where the word eventually displays something that appears to be prohibited language. Other programs may abbreviate text to summarize data, such as news feed applications that present news headlines in a limited space or email applications that have to summarize or truncate certain words of a subject line to fit them into a preview screen. Some programs may abbreviate text when renaming and/or adding to a file or object name. In some embodiments, the system determines what the proposed abbreviated text substring will be prior to presenting the proposed abbreviated text substring on a display. Thus, in some embodiments, the system detects prohibited language before it is displayed.

The system further checks the abbreviated text substring for prohibited language (304). For example, the system can run the abbreviated text substring through a language filter. In some cases, the abbreviated text substring may include a textual character at the end of the text substring, such as a period, to emphasize that the text string has been abbreviated. The system can disregard the textual character at the end of the text substring.

The system further determines whether prohibited language is detected (306) and, if so, the system can modify the proposed abbreviated text substring (308). The system can modify the proposed abbreviated text substring by changing or obscuring characters in the proposed abbreviated text substring, adding characters to the proposed abbreviated text substring, and/or by removing characters from the proposed abbreviated text substring, mu similarly described previously. The system can then recheck the modified version of the proposed abbreviated text substring (304). If prohibited language is again detected (306), the system can re-modify the proposed abbreviated text substring (308). If no prohibited language is detected (306), the system authorizes the proposed text substrings for the line wrap function. For instance, the system can return a result that indicates no prohibited language was detected and that indicates that the proposed text substrings can be presented via the line wrap function. In other examples, the system can check the text substrings immediately after the line-wrap function divides the text string and, if the system detects no prohibited language, then the system can do nothing and not interfere with the line-wrap function.

Figure 4:
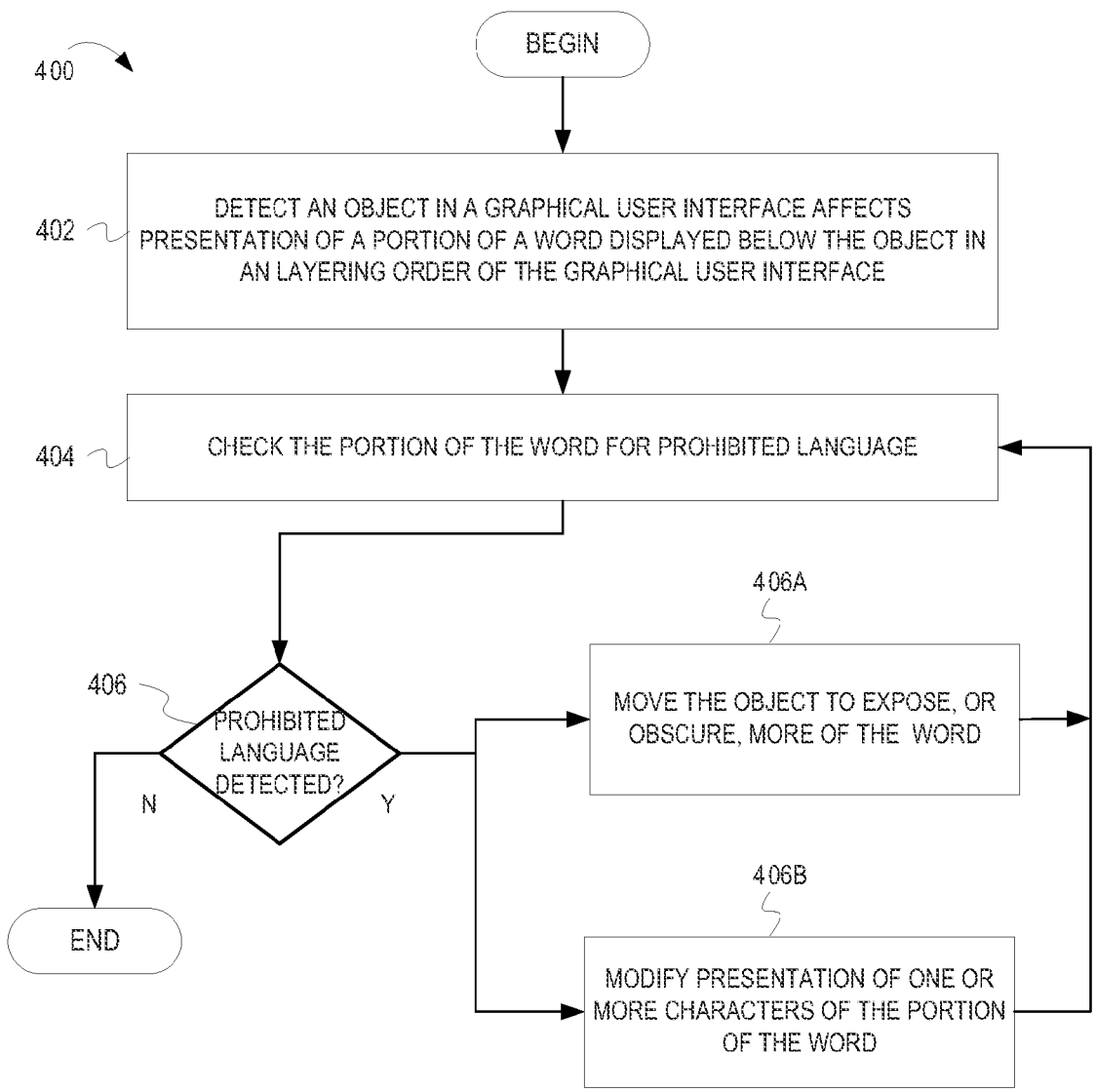
FIG. 4 is a flowchart depicting example operations for filtering prohibited language displayed, or potentially displayed, via an object placement in a graphical user interface.

FIG. 4 is a flowchart depicting example operations for filtering prohibited language displayed, or potentially displayed, via an object placement in a graphical user interface. For example purposes, operations associated with the blocks in FIG. 4 will be described as being performed by a language filtering system ("system"). FIG. 4 illustrates a flow 400 that the system can perform. In some embodiments, the flow can be performed in parallel with the flow of FIG. 2 or FIG. 3. In other embodiments, some or all of the flow of FIG. 4 may be performed separately and independently from the flow of FIG. 2, 3, or 4.

Referring to FIG. 4, the system detects that an object in a graphical user interface affects presentation of a portion of a word displayed below the object in a layering order of the graphical user interface (402). The object may be a graphic, a window, an application layer, a toolbar, a file, or any item that appears in a graphical user interface that can cover, obscure, or overlap another item. The object and the word may be contained within, controlled by, or assigned to a single application, process, thread, etc. For example, the object may be a detachable toolbar in a window assigned to an instance of a word processing application. The toolbar may be detached and floating in front of textual content also presented within the window. In other examples, the object and the word may be assigned to, or associated with, independent applications. FIG. 1A, for example, illustrated one or more words 104 and 106 in a second window that were obscured by the first window 101. The first window 101 may be assigned to a first application whereas the second window 102 may be assigned to a second, independent, application. Further, the system can determine, after movement of an object that a portion of the word is covered, or otherwise obscured, by a portion of the object that was just moved. For instance, in FIG. 1A, the first window 101 may have been moved, or resized, by a user, or a program, to cover a portion of the second window 102. In other examples, the first window 101 my have appeared automatically in response to a launch process, which causes the first window 101 to be automatically superimposed over the second window 102. In some embodiments, the system can determine whether a portion of the word is displayed by checking display bits of the words, as similarly described in connection with FIGS. 1A-1B.

Still referring to FIG. 4, the system further checks whether the portion of the word is prohibited language (404). For example, the system can run the portion of the word through a language filter. In some embodiments, as described previously, the portion of the word may not be an ASCII textual character, and, as a result, the system may first perform a graphical to text conversion of the portion of the word.

The system further determines whether prohibited language is detected (406) and, if so, the system can perform one or more different corrective processes. For example, the system can move the object to expose more of or obscure more of, the word (408A). In another example (i.e., instead of and/or concurrently with 408A) the system can modify presentation of one or more of the characters of the portion of the word (e.g., replace and/or swap character(s) in the portion of the word, obscure character(s) in the portion of the word with graphics, add characters to the portion of the word, subtract characters from the portion of the word, etc.). The system can then recheck the displayed portion of the word (404). For example, if the object is moved to expose, or obscure, more of the word (i.e., 408A), the system can check the portion of the word after new characters in the word are exposed in the portion of the word after the object is moved (e.g., resized, shifted in position, etc.) or check remainder of the word after some of the characters are covered up by the movement of the object. Further, if the system modifies presentation of characters (406B), the system can check the portion of the word again after being modified. If prohibited language is again detected (406), the system can repeat in a loop (e.g., 408A and/or 408B). If no prohibited language is detected (406), the system does not have to take any further action, and the flow 400 can end.

As will be appreciated by one skilled in the art, aspects of the present inventive subject matter may be embodied as a system, method or computer program product. Accordingly, aspects of the present inventive subject matter may take the form of an entirely hardware embodiment, an entirely software embodiment (including firmware, resident software, micro-code, etc.) or an embodiment combining software and hardware aspects that may all generally be referred to herein as a "circuit," "module" or "system," Furthermore, aspects of the present inventive subject matter may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RIP, etc., or any suitable combination of the foregoing.

Computer program code for carrying out operations for aspects of the present inventive subject matter may be written in any combination of one or more programming languages, including an object oriented programming language such as Java, Smalltalk, C++ or the like and conventional procedural programming languages, such as the "C" programming language or similar programming languages. The program code may execute entirely on the users computer, partly on the user's computer, as a stand-alone software package, partly on the user's computer and partly on a remote computer or entirely on the remote computer, or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present inventive subject matter are described with reference to flowchart illustrations and/or block diagrams of methods, apparatus (systems) and computer program products according to embodiments of the inventive subject matter. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

Figure 5:
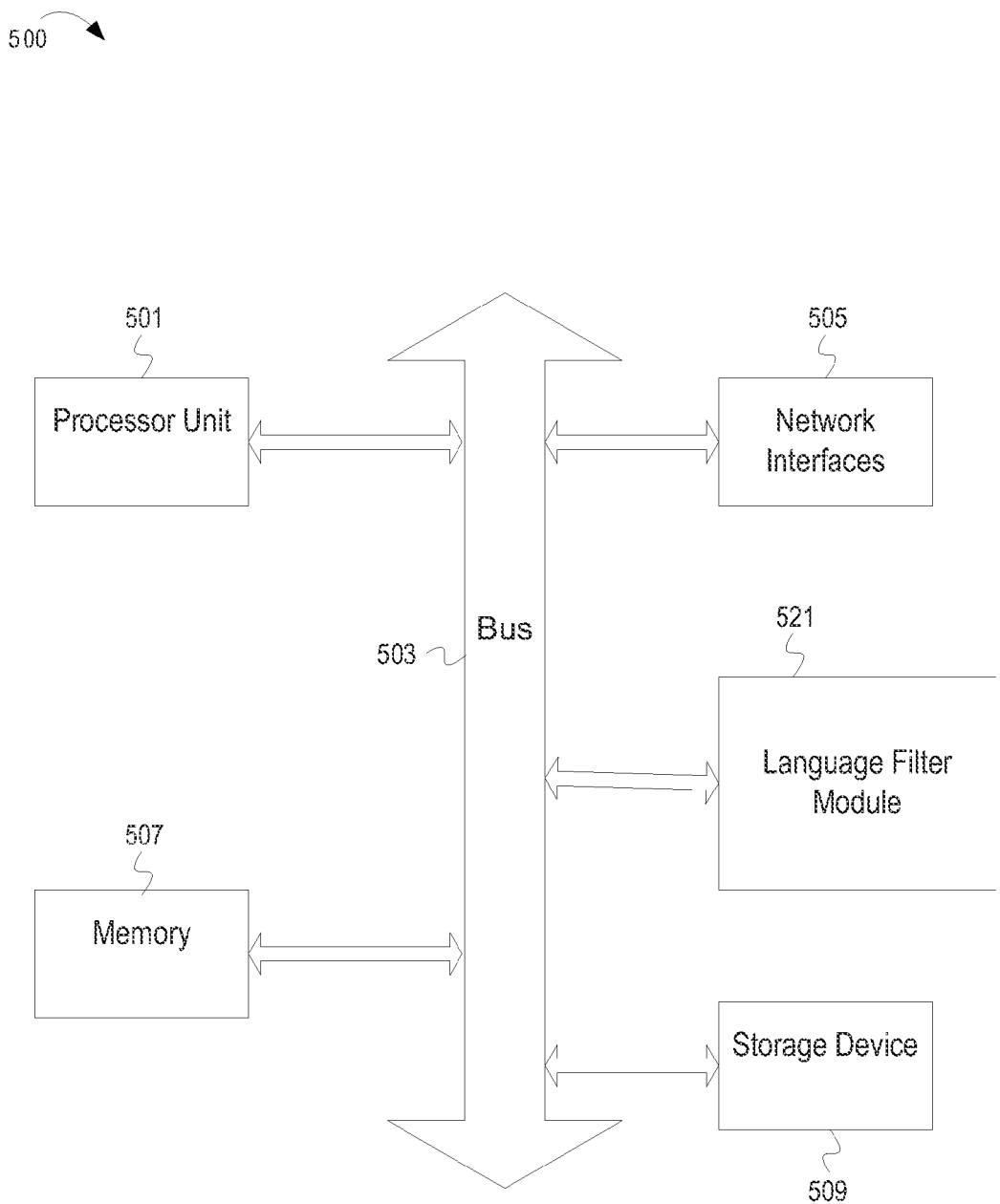
FIG. 5 depicts an example computer system.

FIG. 5 depicts an example computer system 500. The computer system 500 includes a processor unit 501 (possibly including multiple processors, multiple cores, multiple nodes, and/or implementing multi-threading, etc.). The computer system 500 includes memory 507. The memory 507 may be system memory (e.g., one or more of cache, SRAM, DRAM, zero capacitor RAM, Twin Transistor RAM, eDRAM, EDO RAM, DDR RAM, EEPROM, NRAM, RRAM, SONOS, PRAM, etc.) or any one or more of the above already described possible realizations of machine-readable storage media or computer readable storage media. The computer system 500 also includes a bus 503 (e.g., PCI bus, ISA, PCI-Express bus, HyperTransport® bus, Infini-Band® bus, NuBus bus, etc.), a network interface 505 (e.g., an ATM interface, an Ethernet interface, a Frame Relay interface, SONET interface, wireless interface, etc.), and a storage device(s) 509 (e.g., optical storage, magnetic storage, etc.). The computer system 500 also includes a language filter module 521. The language filter module 521 can detect, prevent, and/or correct instances of offensive, profane, or other prohibited words, phrases, text strings, symbol groupings, etc., unintentionally formed or caused by machine-related activities or other situations that occur within a user interface. Any one of these functionalities may be partially (or entirely) implemented in hardware and/or on the processing unit 501. For example, the functionality may be implemented with an application specific integrated circuit, in logic implemented in the processing unit 501, in a co-processor on a peripheral device or card, etc. Further, realizations may include fewer or additional components not illustrated in FIG. 5 (e.g., video cards, audio cards, additional network interfaces, peripheral devices, etc.). The processor unit 501, the storage device(s) 509, and the network interface 505 are coupled to the bus 503. Although illustrated as being coupled to the bus 503, the memory 507 may be coupled to the processor unit 501.

While the embodiments are described with reference to various implementations and exploitations, it will be understood that these embodiments are illustrative and that the scope of the inventive subject matter is not limited to them. In general, techniques for detecting, preventing, and/or correcting instances of inadvertently formed prohibited language as described herein may be implemented with facilities consistent with any hardware system or hardware systems. Many variations, modifications, additions, and improvements are possible.

Plural instances may be provided for components, operations, or structures described herein as a single instance. Finally, boundaries between various components, operations, and data stores are somewhat arbitrary, and particular operations are illustrated in the context of specific illustrative configurations. Other allocations of functionality are envisioned and may fall within the scope of the inventive subject matter. In general, structures and functionality presented as separate components in the example configurations may be implemented as a combined structure or component. Similarly, structures and functionality presented as a single component may be implemented as separate components. These and other variations, modifications, additions, and improvements may fall within the scope of the inventive subject matter.

What is claimed is:

1. A method comprising:
   detecting that a text string is subject to a line-wrap function that would divide the text string into a first plurality of substrings for presentation via a user interface;
   evaluating at least one of the first plurality of substrings against one or more prohibited text strings prohibited for presentation via the user interface;
   detecting, in response to the evaluating of the at least one of the first plurality of substrings against the one or more prohibited text strings, that the at least one of the first plurality of substrings is one or more prohibited text strings; and
   dividing the text string into a second plurality of text substrings that are different from the first plurality of text substrings, wherein the dividing the text string into the second plurality of text substrings is in response to the detecting that the at least one of the first plurality of substrings is one of the one or more prohibited text strings.

2. The method of claim 1 further comprising:
   obscuring presentation of one or more characters included in the second plurality of substrings.

3. The method of claim 1 further comprising:
   one or more of adding one or more characters to the at least one of the second plurality of substrings, removing one or more characters from the at least one of the second plurality of substrings, swapping characters of the at least one the second plurality of substrings, and replacing characters of the at least one the second plurality of substrings.

4. The method of claim 1 further comprising:
   authorizing presentation of the at least one of the plurality of substrings via the user interface after the dividing of the text string into the second plurality of substrings.

5. The method of claim 1 wherein the line-wrap function is configured to abbreviate the text string based on a limited space for presentation of the text string on the user interface.

6. A computer program product for filtering prohibited language, the computer program product comprising:
   a computer readable storage medium having computer readable program code embodied therewith, the computer readable program code configured to,
      detect that a word is subject to an algorithmic function that divides the word into a plurality of proposed text substrings for presentation via a user interface;
      evaluate the plurality of proposed text substrings against a plurality of text strings specified as being prohibited for presentation via the user interface;
      detect, in response to evaluation of the plurality of proposed text substrings against the plurality of text strings, that at least one of the plurality of purposed text substrings appears to be one of the plurality of text strings; and
      one or more of add characters to the at least one of the plurality of proposed text substrings and swap characters of the at least one of the plurality of proposed text substrings in response to detection that the at least one of the plurality of proposed text substrings appears to be the one of the plurality of text strings.

7. The computer program product of claim 6, wherein the computer readable program code is further configured to
   re-divide the word into a plurality of additional proposed text substrings that are different from the plurality of proposed text substrings;
   re-evaluate the plurality of additional proposed text substrings against the plurality of text strings; and
   detect, in response to re-evaluation of the plurality of additional proposed text substrings, that the plurality of additional proposed text substrings are not any of the plurality of text strings.

8. The computer program product of claim 6, wherein the computer readable program code is further configured to:
   obscure presentation of one or more characters of the at least one of the plurality of proposed text substrings.

9. The computer program product of claim 6, wherein the computer readable program code is further configured to
   remove characters from the at least one of the plurality of proposed text substrings and replace characters of the at least one of the plurality of proposed text substrings.

10. The computer program product of claim 6, wherein the computer readable program code is further configured to
    authorize presentation of the at least one of the plurality of proposed text substrings via the user interface after modification of the at least one of the plurality of proposed text substrings.

11. The computer program product of claim 6, wherein the algorithmic function comprises a line-wrap function.

12. An apparatus comprising:
a processing unit;
a network interface; and
a language filter module operable to
  detect that an object in a graphical user interface obscures presentation of a first portion of a word below the object in a layering order of the graphical user interface, wherein a second portion of the word is displayed,
  evaluate the second portion of the word against a plurality of words prohibited for presentation via the graphical user interface,
  detect, in response to evaluation of the second portion of the word against the plurality of words prohibited for presentation via the graphical user interface, that the second portion of the word is one of the plurality of words prohibited for presentation via the graphical user interface, and
  modify presentation of the word in response to detection that the second portion of the word is one of the plurality of words prohibited for presentation via the graphical user interface.

13. The apparatus of claim 12, said language filter module configured to
  prior to the movement of the object in the graphical user interface, set display bits associated with characters of the word to indicate that the word is displayed on the graphical user interface,
  after movement of the object, set a first portion of the display bits, for a first portion of the characters of the word that are obscured, to indicate that the first portion of the characters are obscured, and
  evaluate a second portion of the characters of the word, which are displayed, against the plurality of words prohibited for presentation via the graphical user interface.

14. The apparatus of claim 12, said language filter module configured to
  perform a text recognition function on the second portion of the word prior to evaluation of the second portion of the word against the plurality of words prohibited for presentation via the graphical user interface.

15. The apparatus of claim 14, said language filter module configured to
  prior to the movement of the object in the graphical user interface, set display bits associated with characters of the word to indicate that the word is displayed on the graphical user interface,
  after movement of the object, set a first portion of the display bits, for a first portion of the characters of the word that are obscured, to indicate that the first portion of the characters are obscured, and
  evaluate a second portion of the characters of the word, which are displayed, against the plurality of words prohibited for presentation via the graphical user interface.

16. The apparatus of claim 12, wherein the language filter module is operable to modify the presentation of the word being operable to
  resize the object within the graphical user interface to either expose one or more characters of the first portion of the word or obscure one or more characters of the second portion of the word.

17. The apparatus of claim 12, wherein the language filter module is operable to modify the presentation of the word being operable to
  modify one or more characters of the second portion of the word.

18. The apparatus of claim 17, wherein the language filter module is operable to modify the one or more characters of the second portion of the word being operable to one or more of add additional characters to the one or more characters of the second portion of the word, remove a portion of the one or more characters of the second portion of the word, swap a position of the one or more characters of the second portion of the word, and replace a portion of the one or more characters of the second portion of the word.

19. The apparatus of claim 12, wherein the language filter module is operable to modify the presentation of the word being operable to obscure one or more characters of the second portion of the word with a graphic.

* * * * *